United States Patent [19]

Lunsford

[11] Patent Number: 4,697,854
[45] Date of Patent: Oct. 6, 1987

[54] PORTABLE ENCLOSED HYGENIC WORKSTATION

[76] Inventor: Thomas J. Lunsford, 1215 Pioneer Way, El Cajon, Calif. 92020

[21] Appl. No.: 791,590

[22] Filed: Oct. 25, 1985

[51] Int. Cl.⁴ .............................................. B65O 6/00
[52] U.S. Cl. .................... 312/223; 220/4 C; 51/270
[58] Field of Search ................. 312/1, 223; 220/4 C; 51/270, 426

[56] References Cited

U.S. PATENT DOCUMENTS

| | | | |
|---|---|---|---|
| 1,007,272 | 10/1911 | Crease | 51/270 |
| 3,086,674 | 4/1963 | Scheverman | 312/1 |
| 3,088,627 | 5/1963 | Saunders | 312/1 |
| 3,410,619 | 11/1988 | Delnay et al. | 312/1 |
| 4,059,903 | 11/1977 | Piet et al. | 312/1 |
| 4,242,310 | 12/1980 | Greff et al. | 312/1 |

Primary Examiner—Joseph Falk
Attorney, Agent, or Firm—Charles C. Logan, II

[57] ABSTRACT

A portable enclosed hygenic workstation having a box-like housing and a box-like top cover. The box-like housing and box-like top cover are detachably connected to each other along the edges of their respective walls and form a work chamber therewithin. The portable workstation has been designed so that it may be placed upon the lap of a worker in a sitting position. A pair of laterally spaced hand holes are formed in the front wall of the box-like housing and the worker may insert their hands through these holes to perform work within the work chamber. A cutout window is formed in the top wall of the top cover and it is covered by a transparent window pane so that the worker can observe the work being performed in the work chamber by their hands. A florescent lamp is mounted in the interior of the top cover for illuminating the work chamber. A magnifying lens is detachably secured to the top surface of the transparent window pane to aid in performing intricate detail work within the work chamber. The portable work station is compact in size and also lightweight.

6 Claims, 3 Drawing Figures

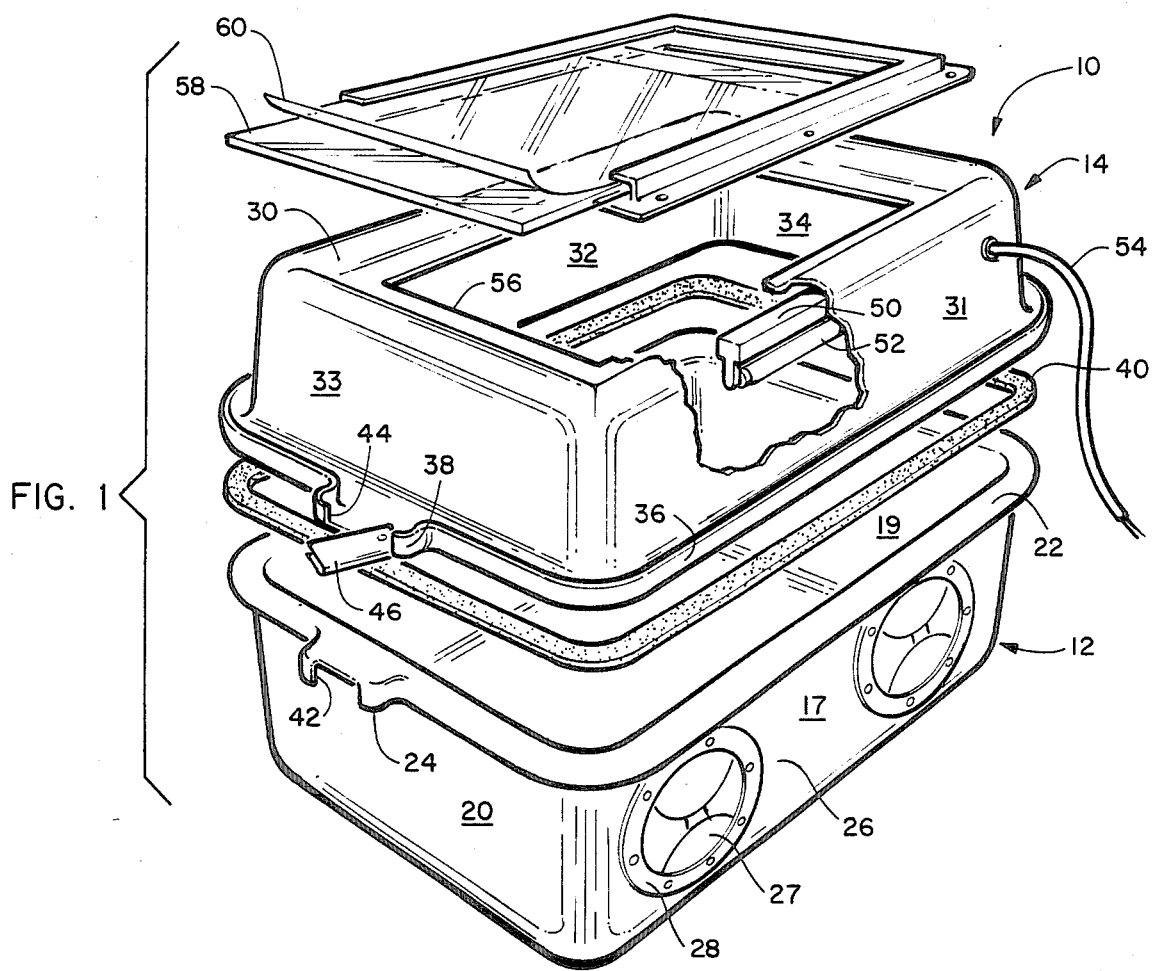
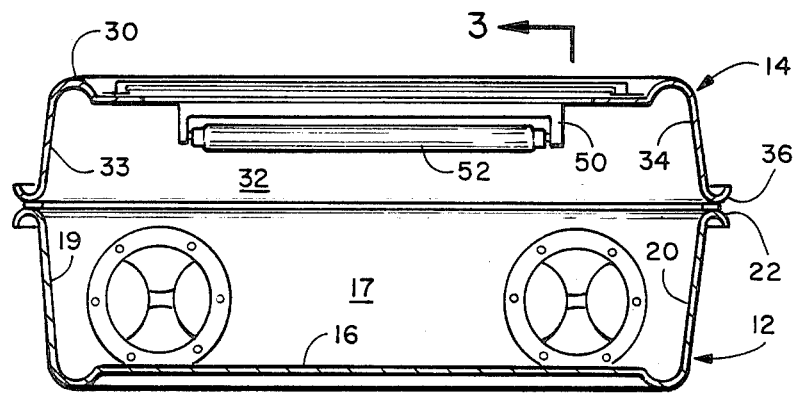
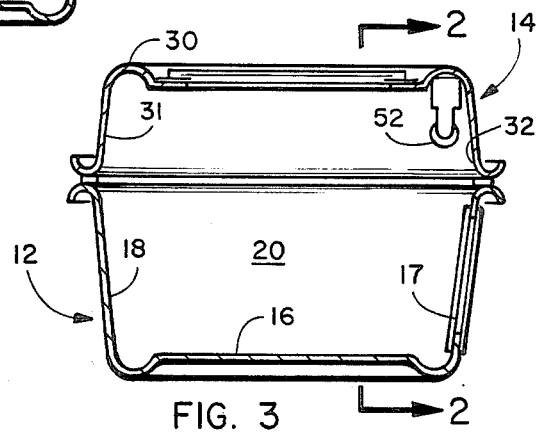

PORTABLE ENCLOSED HYGENIC WORKSTATION

BACKGROUND OF THE DISCLOSURE

The invention relates to a box-like container and more specifically one that functions as a portable hygienic workstation that is positioned upon a workers lap and which has hand holes in its front wall so that the worker may perform work with their hands within the work chamber inside the box-like housing.

Presently a large number of dolls and figurines are being manufactured both in factories and in individual workers homes. One of the operations performed on the dolls as they are being made requires that they be cleaned or sanded after they have been cast and exist as greenware. Some of the areas to be smoothed are the part lines that have been trimmed and also rough spots on the castings themselves. The rough spots are hard to see with the naked eye and are sometimes inspected for by using a magnifying lens. It is important to have a smooth surface on the exterior of the dolls prior to the painting operation.

The sanding or smoothing of the greenware castings create powder or dust. This dust contains talc which oftentimes gets into the lungs of the worker thereby causing an unhealthy work area.

It is an object of the invention to provide a portable enclosed workstation which allows a worker to perform sanding and smoothing operations on greenware castings without having to inhale the dust created from this operation.

It is also an object of the invention to provide a novel portable hygenic workstation that can be positioned upon the lap of the worker.

It is another object of the invention to provide a novel portable enclosed workstation that isolates the workers hands in the workstation where he performs his work operations.

It is a further object of the invention to provide a novel portable enclosed hygienic workstation that is compact and lightweight.

It is an additional object of the invention to provide a novel portable enclosed hygienic workstation that has its own illumination structure therewithin.

SUMMARY OF THE INVENTION

Applicant's novel portable enclosed hygienic workstation is formed from a box-like housing and a box-like top cover. These two members are detachably connected to each other along the matting edges of their walls. The bottom box-like housing has a pair of laterally spaced hand holes in its front wall. These hand holes are covered by flexible flap members which overlap in the nature of a camera's shutter structure and which allow a workers hands to be inserted therethrough. The flexible flap members tend to cling to the worker's arms thereby sealing off the work chamber within the box-like housing.

The top wall of the cover has a cutout window within which is mounted a transparent window pane. This allows the workers to look down into the work chamber of the workstation so that they may view the operations being performed by their hands.

The transparent window pane in the top cover has anti-static properties. The box-like housing and the box-like top cover are made of plastic material which exhibits static properties. As a result of the static and anti-static properties of the different components, the dust created during the sanding operation will be repulsed from the window pane and attracted to the plastic walls of the housing and top cover. This keeps the airspace within the workstation relatively clear so that visual work can be performed therein on the dolls and figurines.

The size and weight of the portable workstation is such that it can be comfortably positioned of the lap of the worker while they are performing the operation of cleaning or sanding the greenware castings of the dolls they are making.

A florescent lamp fixture is mounted within the interior of the top cover for illuminating the work chamber. A magnifying lens is removably mounted atop the transparent window pane so that the worker can see rough spots on the castings that are hard to see with the naked eye.

DESCRIPTION OF THE DRAWINGS

FIG. 1 is an exploded front perspective view of the novel portable enclosed hygienic workstation;

FIG. 2 is a side elevation cross sectional view of the novel portable enclosed hygienic workstation; and FIG. 3 is a cross sectional view taken lines 3—3 of FIG. 2.

DESCRIPTION OF THE PREFERRED EMBODIMENT

Applicant's novel portable enclosed hygienic workstation will now be described by referring to FIGS. 1-3 of the drawings. The portable enclosed hygenic workstation is generally designated numeral 10.

The workstation 10 has a box-like housing 12 and a box-like top cover 14. They are symmetrical in shape.

Box-like housing 12 has a bottom wall 16, a front wall 17, a rear wall 18, and laterally spaced side walls 19 and 20. The top edge of these walls have a flange 22. Handles 24 are formed on the respective side walls.

A pair of laterally spaced hand holes 26 are formed in front wall 17. They have a plurality of flexible flap members 27 that are secured in position by mounting rings 28.

The top cover 14 has a top wall 30, a front wall 31, a rear wall 32, and laterally spaced side walls 33 and 34. The bottom edge of these walls has a flange 36. A pair of handles 38 are formed on the respective side walls.

The box-like housing 12 and the top cover 14 are detachably connected together with a gasket 40 positioned between the respective flanges 22 and 36. Notches 42 are formed in handles 24 and notches 44 are formed in handles 38. A latch 46 is pivotally attached in notch 44.

A florescent lamp fixture 50 is mounted on the inside of top cover 14. It has a bulb 52 and an electrical cord 54.

A cutout window 56 is formed in top wall 30 and it is covered by a transparent window pane 58.

A flexible plastic magnifying lens 60 is removeably positioned above transparent window pane 58.

What is claimed is:

1. A portable enclosed hygienic workstation for sanding greenware castings therein comprising:
   a box-like housing having a bottom wall, a front wall, a rear wall, and a pair of laterally spaced side walls, said walls forming a work chamber within them, said housing being molded from plastic material having means exhibiting static properties that attract dust particles created during the sanding of greenware casting, the top edge of said front wall, rear wall, and laterally spaced side walls have an outwardly flange that extends around the periphery of these walls to form a surface for mating with a sealing gasket;

means in said front wall for allowing insertion of a pair of hands into said work chamber comprising a pair of laterally spaced hand holes, each of said hand holes having a flexible flap member covering said hand hole;

a top cover for said box-like housing is removably secured to the upper portions of the front, rear, and side walls of said box-like housing, said top cover having a top wall, a front wall, a rear wall and a pair of laterally spaced side walls, said walls forming an upper chamber area within them, said top cover being molded from plastic material having means exhibiting static properties that attract dust particles created during the sanding of greenware castings, the bottom edge of said front wall, rear wall and laterally spaced side walls have an outwardly extending flange that extends around the periphery of these walls to form a surface from mating with a sealing gasket;

a gasket positioned between the respective flanges of said box-like housing and said top cover for preventing powder and dust from escaping from the work chamber of said enclosed hygienic workstation, quick release latch means on said respective flanges for holding said box-like housing and said top cover together;

a cutout window is formed in the top wall of said top cover so that a person performing work in said work chamber with their hands can view the work being performed;

a transparent window pane covering said cutout window, said window pane being formed of material having means exhibiting anti-static properties that repel dust particles created during the sanding of greenware castings; and a florescent lighting fixture mounted in the upper chamber area within said top cover.

2. A portable enclosed hygienic workstation as recited in claim 1 wherein the bottom wall of said box-like housing has a substantially rectangular shape.

3. A portable enclosed hygienic workstation as recited in claim 1 further comprising a magnifying lens positioned above said transparent window pane.

4. A portable enclosed hygienic workstation as recited in claim 3 wherein said magnifying lens is detachably mounted in said top cover.

5. A portable enclosed hygienic workstation as recited in claim 1 wherein said box-like housing is less than 30 inches long and less than 24 inches deep so that it can be conveniently positioned on a workers lap while they are in a sitting position.

6. A portable enclosed hygienic workstation as recited in claim 5 wherein said workstation weighs less than five (5) pounds.

* * * * *